Figure 1:
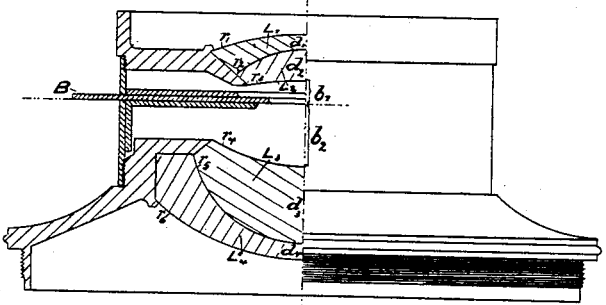

(No Model.)

P. RUDOLPH.
PHOTOGRAPHIC OBJECTIVE.

No. 444,714. Patented Jan. 13, 1891.

2 Sheets—Sheet 1.

Witnesses:
William H. Shipley
Evell A. Dick

Inventor:
Paul Rudolph
by Marcellus Bailey
his attorney (No Model.)  2 Sheets—Sheet 2.

P. RUDOLPH.
PHOTOGRAPHIC OBJECTIVE.

No. 444,714. Patented Jan. 13, 1891.

Witnesses:  Inventor:

UNITED STATES PATENT OFFICE.

PAUL RUDOLPH, OF JENA, GERMANY, ASSIGNOR TO CARL ZEISS, OF SAME PLACE.

PHOTOGRAPHIC OBJECTIVE.

SPECIFICATION forming part of Letters Patent No. 444,714, dated January 13, 1891.

Application filed April 15, 1890. Serial No. 348,014. (No model.)

*To all whom it may concern:*

Be it known that I, PAUL RUDOLPH, a subject of the Duke of Saxe-Altenburg, residing at Jena, in the Grand Duchy of Saxe-Weimar, German Empire, have invented a new and useful Improvement in Photographic Objectives, whereof the following is a specification.

My invention relates to photographic objectives; and its purpose is to remove in a more perfect manner than has heretofore been possible the indistinctness of the marginal portions of the image. This indistinctness is principally caused by the deficiency, inherent more or less in all photographic objectives of the present day, that the rays of light lying in the primary (or meridional) section of an oblique pencil of rays transmitted through the objective do not unite in the same point as the rays lying in the secondary (or sagittal) section of the same pencil; or, in other words, the focal length of the rays in the primary section of an oblique pencil differs from the focal length of the rays in its secondary section. The property of the said rays of not uniting in the same point is termed "astigmatism," while the distance of the two partial focal points of such pencil from each other, or difference of the specified focal lengths, is called the "astigmatic difference" of the pencil. The focal length of the rays in the primary section may be greater or smaller than the focal length of the rays in the secondary section. If the former is greater than the latter, (as in all ordinary objectives,) the astigmatic difference is positive, while in the contrary case it is negative. Now, in view of obviating the deficiency arising from the said astigmatic difference, I compose the objective of two separate systems of lenses constructed in such manner that one of them will produce a positive astigmatic difference in the transmitted oblique pencils, or a greater focal length of the rays in the primary section, while the other system produces a negative astigmatic difference, or a shorter focal length of the rays in the said primary section. A compensation of these opposite effects is thus obtained wherefrom oblique pencils result which do not present any sensible astigmatic difference. In order to attain this compensation and at the same time to secure favorable conditions for the achromatization of the complete objective, I employ a system of lenses characterized by the concurrence of the following two properties: First, that in one of the two distinct systems the positive member (collecting-lenses) has a smaller, in the other system, however, a greater, refractive index than the negative member (dispersing-lenses) cemented thereto; second, that each system in itself is approximately achromatized—*i. e.*, that the chromatic aberration of each of the systems expressed by the difference of the reciprocals of its focal lengths for two different colors is small as compared with the chromatic aberration of a single crown-glass lens having the focal length of the entire objective, the latter chromatic aberration being measured after the same manner as the former. A combination of lenses realizing both these requirements simultaneously presents particular advantages. On the one hand it admits of the astigmatic differences being removed without rendering the application of more than two distinct systems necessary, and on the other hand it yields favorable conditions for satisfying all the other requirements connected with the correction of photographic objectives.

The above-defined contrariant combination of the two distinct systems composing the objective furnishes the simplest means for compensating the astigmatic differences of oblique pencils. This is due to the fact that a system composed of lenses cemented together, and in which the collecting-lens has a greater refractive index than the dispersing-lens, gives rise to astigmatic differences opposite to those caused by a system of lenses the collecting-lens whereof possesses a lower refractive index than the dispersing-lens.

With the mode of compounding both parts of the objective, as indicated above, it is therefore only necessary to choose the ratios of curvatures of the single lenses in both these parts in such a manner that the opposed astigmatic differences are of the same magnitude, in view of attaining compensation of this astigmatism or anastigmatic correction of the entire objective; but in order that the realization of this condition does not enhance the difficulty of achromatizing the whole objective it is essential that the objective possesses also that second property, as defined at the beginning of this specification—i. e., it is necessary to effect the contrariant composition of the two separate systems in such a manner that at the same time each system may be in itself achromatized. It is, however, neither particularly advantageous nor in all cases practicable to perfectly achromatize the individual members of a double objective, for the mere thicknesses which must be given to the lenses may in each member of the objective necessitate deviations from achromatism amounting to about one-fourth of the chromatic difference of the reciprocals of the focal lengths of a single crown-glass lens having the focal length of the whole objective; but it is of practical importance that the mode of composing the systems of lenses does not in itself involve any limitations even to their approximate achromatization, and that it does not render inevitable still greater chromatic differences than are required to meet other conditions. This last requirement may be satisfied by a suitable choice of the combinations of glass which are employed to form the two parts of the objective.

The following observations may explain the principles which govern the selection of suitable glasses. Those pairs of glasses (crown and flint) which are generally resorted to in the construction of achromatic lenses (and which a few years ago constituted the sole means of obtaining achromatism) possess this characteristic feature that a higher refractive index invariably implies a greater relative dispersive power. (Under the term "dispersive power" is to be understood, as usual, the quotient $\left(\frac{\Delta n}{n-1}\right)$—i. e., the difference between the refractive indices for two different colors divided by one of these indices or by the mean index of refraction, minus one.) A pair of glasses of this kind, which may be said to be of a normal character, admits of the application of positive (collecting) systems, if achromatism is to be attained, only under the condition that the positive element has a lower refractive index than the negative. Recent progress in glass-manufacture has, however, added to the list of optical glasses other kinds of glasses which admit of such pairs being selected in which the relation of the refractive indices and the relative dipersive powers is just the opposite as in the other case—i. e., in which the glass having the higher refractive index does not also possess the greater, but, on the contrary, the smaller relative dispersive power. Such pairs of glasses may be said to be of an abnormal character in contradistinction to the first-named glass. The application of pairs of glasses of the last-named or abnormal character admits of the production of systems with positive focal lengths in which, without prejudice to the attainment of achromatism, the more refractory medium acts as the positive (collecting) element. Accordingly, in an objective consisting of two distinct systems the contrarious elements required for compensation of astigmatic deviations are obtained without prejudice to full liberty as regards achromatization of each single system by compounding one of the systems—presuming both to be positive systems—of a normal, the other of an abnormal pair of glasses, (the terms "normal" and "abnormal" being taken in the sense of the definition as given above.)

The elements of actual construction of objectives, as specified in Tables I, II, and III, furnish examples for the practical application of this invention under varying conditions. The opposite character of the pairs of glasses in the two separate members of a doublet are, however, conditional to the desired effect only in case both these members are required to be positive (collecting) systems, and if both are also required to assist in a notable degree in the concentration of the rays of light, or, in other words, in the diminution of the focal length of the objective. For many purposes it may, however, be sufficient or even advantageous to assign the function of the concentration of the rays of light wholly or principally to one system, (principal system,)—viz., in such a manner that the other need not produce any notable refractory effects in the sense of a diminution of the focal distance, it having simply and essentially to act as a correcting system, which admits of a relatively large positive or even negative focal length. Accordingly, as in this particular case the principal system consists of a normal or of an abnormal pair of glasses, the positive or the negative element of the correcting system must be made to have the higher refractive index. The nature of the pair of glasses of which the correcting system is composed—i. e., whether it is of a normal or of an abnormal character—is, however, non-essential, provided its focal lengths be taken very great. If, however, a negative focal length which is not very great as compared with the focal length of the principal system be given to the correction system, the latter, in order to insure the condition of achromatization, must be composed of a pair of glasses of the same character as the principal system—i. e., either both of pairs of glasses of the normal or both of pairs of glasses of the abnormal character.

The elements of construction as specified under Table IV serve to illustrate an anastigmatic combination of lenses of this last kind, in which one of its members constitutes such a correcting system of a negative focal length, both members consisting of normal pairs of glasses.

The new type of photographic doublets thus set forth admits, as is shown by the preceding explanations and the examples appended to this specification, of many modifications of detail, which modifications do not, however, introduce any novel features. In focal lengths of both parts of the double objective may have any ratio whatever. The system consisting of an abnormal pair of glasses, and likewise the correcting system, assuming this latter case to enter into consideration, may constitute either the anterior or posterior member of the combination. Finally, a great variety of glasses may be employed for carrying out the constructive principles, as stated above, provided they leave sufficient scope for the selection of such pairs as are prescribed in each particular case by the foregoing directions. All these special alternatives of practical construction are intrinsically dependent upon the particular purpose which such an objective has to serve and the corresponding conditions regarding the aperture, the size of the field, and the degree of perfection required with respect to correction. Whenever these particular conditions on the one hand and the optical constants (refractive index and dispersive power) of the available kinds of glasses on the other hand are given numerically, any optician versed in the treatment of problems of this kind is enabled, guided by the preceding remarks and the examples appended at the end of this specification to numerically determine according to known methods those elements of construction (radii, thicknesses of lenses, air-distances) which will sufficiently compensate astigmatic deviation, besides furnishing all the other usual corrections. In particular no novel constructive feature is introduced by making one (vide Table III) or both of the cemented systems of the doublet to consist of three instead of two lenses, which may be particularly advantageous in such cases where the objective is to have a large aperture. For inasmuch as the use of three single lenses has no other aim in view but to distribute the effect otherwise attained by a single lens over two made of the same or similar kinds of glass, the substitution of a triple for a double lens belongs to those expedients which are ordinarily made use of by practical and theoretical opticians in order to attain an increased number of elements affording means for optical correction.

In the annexed drawings three different arrangements of objectives carried out according to my invention are shown in full size, partly in elevation and partly in section.

According to Figure 1 the anterior system of lenses is composed of the dispersing-lens $L_1$ and the collecting-lens $L_2$, while the posterior system consists in the collecting-lens $L_3$ and the dispersing-lens $L_4$, all these lenses being concavo-convex. B is the diaphragm. In the objective represented by Fig. 2 the anterior system $L_1 L_2$ is composed alike to the preceding one, whereas the posterior system consists in the biconcave dispersing-lens $L_3$ and the biconvex collecting-lens $L_4$. Fig. 3 shows a like system $L_1 L_2$, while the posterior system comprises two concavo-convex dispersing-lenses $L_3$ and $L_5$ and the concavo-convex collecting-lens $L_4$. The letters $r_1 r_2 r_3 r_4 r_5 r_6 r_7$, to be referred to hereinafter, denote the radii of curvature of the lens surfaces to which they are applied, $d_1 d_2 d_3 d_4 d_5$ the central thicknesses of the lenses, and $b_1 b_2$ the distances between the diaphragm B and the lenses.

In conclusion I append to this specification of my invention four examples which serve to illustrate the manner in which the principles set forth in the preceding pages may be applied to the construction of different types adapted to various purposes. All dimensions (radii, thicknesses of lenses, and air-distances) are expressed by proportional numbers, the focal length of the whole objective being taken as unity. A simple multiplication of these numbers with the focal length actually required will suffice for obtaining the dimensions of any objective wanted.

The letters of the following tables correspond to the letters marked on the drawings.

The different kinds of glasses are determined by the indices $n_D$ and $n_{G_1}$, relating, respectively, to the D line of the spectrum and to the $H_J$ line of the spectrum of hydrogen. In order to render obvious the character of the pairs of glasses used in each system, I have appended to each kind of glass the value of the relative dispersive power $\left(\dfrac{\triangle n}{n-1}\right)$, where $\triangle n$ has been calculated for the interval from the D to the $H_J$ line of the spectrum, while the value of $n_D$ is taken for $n$.

EXAMPLES.

Table I.

Objective of the kind shown by Fig. 1, consisting of two positive systems having greatly-differing focal lengths.

Effective aperture, 0,056.

Angle of field about one hundred and ten degrees.

Radii:
$r_1 = +0,2041$
$r_2 = +0,0962$
$r_3 = +0,3329$
$r_4 = -0,1589$
$r_5 = -0,0962$
$r_6 = -0,1798$ Thicknesses of glass:
$d_1 = 0,013$
$d_2 = 0,025$
$d_3 = 0,067$
$d_4 = 0,013$ Distances of diaphragm B:
$b_1 = 0,013$
$b_2 = 0,057$

Kind of glass employed.

| | $n_D$ | $n_{G_1}$ | $\dfrac{\triangle n}{n-1}$ | |
|---|---|---|---|---|
| $L_1$ | 1,55540 | 1,57036 | 0,0269 | normal pair of glasses, focal length $= +1,127$. |
| $L_2$ | 1,51900 | 1,53047 | 0,0221 | |
| $L_3$ | 1,57360 | 1,58642 | 0,0224 | abnormal pair of glasses, focal length $= +3,378$. |
| $L_4$ | 1,54763 | 1,56316 | 0,0284 | |

The objective of this combination (represented in full size by Fig. 1) has a focal length of twenty-four centimeters.

Table II.

Figure 2:
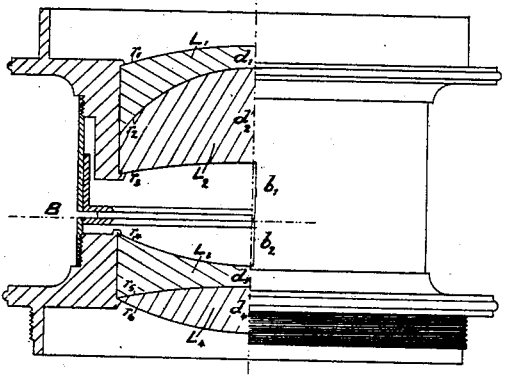
Figure 3:
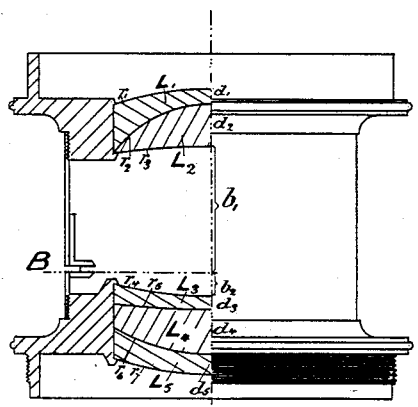

Objective of the kind shown by Fig. 2, consisting of two positive systems having but slightly-differing focal lengths.

Effective aperture, 0,166.

Angle of field about seventy-five degrees.

| Radii: | Thicknesses of glass: |
|---|---|
| $r_1 = +0,2559$ | $d_1 = 0,012$ |
| $r_2 = +0,1029$ | $d_2 = 0,062$ |
| $r_3 = +0,4122$ | $d_3 = 0,012$ |
| $r_4 = -0,2058$ | $d_4 = 0,029$ |
| $r_5 = +0,4122$ | Distances of diaphragm B: |
| $r_6 = -0,1897$ | $b_1 = 0,0656$ |
|  | $b_2 = 0,0656$ |

*Kind of glass employed.*

|  | $n_D$ | $n_{G_1}$ | $\frac{\Delta n}{n-1}$ |  |
|---|---|---|---|---|
| $L_1$ : | 1,57973 | 1.59357 | 0,0239 | normal pair of glasses, |
| $L_2$ : | 1,50546 | 1.51610 | 0,0210 | focal length = +2,325. |
| $L_3$ : | 1,53789 | 1.55250 | 0,0272 | abnormal pair of glasses, |
| $L_4$ : | 1,57360 | 1.59642 | 0,0224 | focal length = +1,426. |

The objective of this combination (represented in full size by Fig. 2) has a focal length of thirty-five centimeters.

Table III.

Objective such as shown by Fig. 3, consisting of two positive systems with nearly equal focal lengths.

Effective aperture, 0,180.

Angle of field about seventy degrees.

| Radii: | Thicknesses of glass: |
|---|---|
| $r_1 = +0,3408$ | $d_1 = 0,015$ |
| $r_2 = +0,1217$ | $d_2 = 0,044$ |
| $r_3 = +0,6815$ | $d_3 = 0,015$ |
| $r_4 = -0,3894$ | $d_4 = 0,044$ |
| $r_5 = -0,8763$ | $d_5 = 0,019$ |
| $r_6 = -0,1947$ | Distances of diaphragm B: |
| $r_7 = -0,3213$ | $b_1 = 0,122$ |
|  | $b_2 = 0,024$ |

*Kind of glass employed.*

|  | $n_D$ | $n_{G_1}$ | $\frac{\Delta n}{n-1}$ |  |
|---|---|---|---|---|
| $L_1$ : | 1,55540 | 1.57036 | 0,0269 | normal pair of glasses. |
| $L_2$ : | 1,51310 | 1.52461 | 0,0224 | focal length : = +1,741. |
| $L_3$ and $L_3$ : | 1,53984 | 1.55463 | 0,0274 | abnormal pair of glasses. |
| $L_4$ : | 1,57360 | 1.58642 | 0,0224 | focal length : = +1,809. |

The objective of this combination (shown by Fig. 3) has a focal length of twenty centimeters.

Table IV.

Objective consisting of a positive principal system and a correcting system having a negative focal length.

Effective aperture, 0,056.

Angle of field about one hundred degrees.

The letters correspond to those marked in Fig. 1.

| Radii: | Thicknesses of glass: |
|---|---|
| $r_1 = +0,1928$ | $d_1 = 0,012$ |
| $r_2 = +0,0938$ | $d_2 = 0,056$ |
| $r_3 = +0,1251$ | $d_3 = 0,034$ |
| $r_4 = -0,3127$ | $d_4 = 0,010$ |
| $r_5 = -0,0834$ | Distances of diaphragm B: |
| $r_6 = -0,1511$ | $b_1 = 0,084$ |
|  | $b_2 = 0,034$ |

*Kind of glass employed.*

|  | $n_D$ | $n_{G_1}$ | $\frac{\Delta n}{n-1}$ |  |
|---|---|---|---|---|
| $L_1$ : | 1,51282 | 1.52421 | 0,0222 | normal pair of glasses, |
| $L_2$ : | 1,57973 | 1.59357 | 0,0239 | focal length = -1,5966. |
| $L_3$ : | 1,51680 | 1.52755 | 0,0208 | normal pair of glasses, |
| $L_4$ : | 1,56490 | 1.58215 | 0,0305 | focal length = +0,5956. |

I claim as my invention—

In a photographic objective, the combination of two distinct systems of lenses, each composed of single lenses cemented together, the positive element of one system having a higher, the positive element of the other system a lower, refractive index than the respective negative elements cemented thereto, and each system being in itself approximatively achromatic, substantially as described.

In testimony whereof I have hereunto set my hand in the presence of two subscribing witnesses.

PAUL RUDOLPH.

Witnesses:
 CARL BORNGRAEBER,
 HENRY W. DIEDERICH.